United States Patent
Gasquet (10) Patent No.: US 7,278,768 B2
(45) Date of Patent: *Oct. 9, 2007

(54) INDICATING OR LIGHTING DEVICE WITH A SCREEN OR COVERING HAVING A DIFFUSIVE OR REFLECTIVE FOCUS

(75) Inventor: Jean-Claude Gasquet, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,283

(22) Filed: Sep. 15, 2006

(65) Prior Publication Data

US 2007/0008736 A1    Jan. 11, 2007

Related U.S. Application Data

(63) Continuation of application No. 10/742,108, filed on Dec. 19, 2003, now Pat. No. 7,111,970.

(30) Foreign Application Priority Data

Dec. 20, 2002    (FR) .................................. 02 16429

(51) Int. Cl.
*F21V 11/00*    (2006.01)
(52) U.S. Cl. ...................... 362/539; 362/507; 362/521; 362/543
(58) Field of Classification Search ................ 362/459, 362/475, 487, 498, 507, 511, 514, 516, 521, 362/539, 540, 543, 545
See application file for complete search history.

(56) References Cited

U.S. PATENT DOCUMENTS

| 3,849,642 | A | 11/1974 | Puyplat |
| 6,045,246 | A | 4/2000 | Goto |
| 6,352,359 | B1 | 3/2002 | Shie et al. |
| 7,111,970 | B2 * | 9/2006 | Gasquet ...................... 362/539 |
| 2002/0093829 | A1 | 7/2002 | Pinson et al. |

FOREIGN PATENT DOCUMENTS

| CH | 174 197 A | 12/1934 |
| DE | 101 01 795 A | 7/2002 |
| DE | 102 07 694 A1 | 11/2003 |
| FR | 2 200 806 A | 4/1974 |

* cited by examiner

*Primary Examiner*—Stephen F. Husar
*Assistant Examiner*—Meghan K. Dunwiddie
(74) *Attorney, Agent, or Firm*—Morgan & Finnegan L.L.P.

(57) ABSTRACT

The invention relates to an indicating and/or lighting device for a motor vehicle, said device comprising a casing inside which there are arranged at least one main light source, at least one reflector associated with the main light source(s), optionally at least one intermediate screen that is substantially transparent and lies opposite said main light source or at least one of said main light sources, and a closing covering for the casing. At least one of the faces of the closing covering and/or of the optional intermediate screen is provided with a plurality of foci for diffusing light by means of surface alterations of said face.

12 Claims, 5 Drawing Sheets

INDICATING OR LIGHTING DEVICE WITH A SCREEN OR COVERING HAVING A DIFFUSIVE OR REFLECTIVE FOCUS

This is a continuation of prior application Ser. No. 10/742,108, filed Dec. 19, 2003, now U.S. Pat. No. 7,111,970. The prior application is incorporated herein by reference in its entirety.

CLAIM OF PRIORITY

This application claims priority from French Patent Application No. 02 16 429 filed on Dec. 20, 2002, the entire contents of which are incorporated herein by reference.

FIELD OF THE INVENTION

The present invention relates to the field of indicating and lighting devices for motor vehicles. It more particularly relates to the aspect of indicator lamps, but also applies mutatis mutandis to lighting devices. In the indicating field, just as in the lighting field, there are a large number of regulations which do not leave much room for modifying the aspect of the lamps in the on state, since the photometry of the light beams is imposed to a very great extent. However, style is a very important element in this type of product, and motor vehicle parts manufacturers try to give a "signature" to their products so that they can be easily identified by the end user. However, if this "signature" can be seen during the day when the lamp or headlamp is switched off, then it cannot be seen at night when they are on. This is because at night they are generally not visible over their entire outer surface: only the illuminating areas of the basic optical functions are lit up. Thus, an indicator lamp is made up of several illuminating areas which correspond to the various optical functions that are to be realized, including functions where they are continually on, such as the headlamp function, and functions where they are on only periodically. At night, the appearance of the lamp corresponds to a juxtaposition of illuminating areas that are more or less brightly lit and give a visual impression of inhomogeneity.

BACKGROUND OF THE INVENTION

The indicating or lighting device therefore has two aspects which are quite different depending on whether it is on or off. The current tendency to increase the surface area of headlamps and lamps only accentuates this difference even further. This is particularly the case with lamps having a large outer surface area of the "rear wing" lamp type, that is to say lamps which extend not only on the front or rear face of the vehicle but also on the side thereof at the part where a wing meets this front or rear face. In this specific case, there is often great disparity between the useful lit-up surface area and the full outer surface area of the lamp.

There is therefore a tendency at night to lose the "signature" of the lamp or headlamp. Moreover, and more generally, there is a need to better diversify/adjust the aspect of headlamps or lamps when at least one of their optical functions is on.

The aim of the invention is therefore to improve the aspect of indicating and/or lighting devices, particularly when they are at least partially on. The aim of the invention is also for this improvement to be simple to carry out and simple to use. Yet another aim of the invention is an improvement which can also offer alternatives for realizing standard optical functions such as the sidelight function.

SUMMARY OF THE INVENTION

The object of the invention is firstly an indicating and/or lighting device for a motor vehicle, said device comprising a casing inside which there are arranged at least one main light source, at least one reflector associated with the main light source(s), optionally at least one intermediate screen that is substantially transparent and lies opposite said main light source or at least one of said main light sources, and a closing covering for the casing. At least one of the faces of the closing covering and/or of the optional intermediate screen is moreover provided with a plurality of foci for diffusing light by means of surface alterations of said face.

In the text which follows, the term "lamp" will be used to designate the indicating device according to the invention, and this term should be understood as also being applicable in a similar manner to headlamps, for the purpose of conciseness.

The term "surface alteration" within the context of the invention is understood to mean a modification which does not involve the addition of matter, for example a coating, but rather a local modification of the "relief" of the face in question, which may be a boss or preferably a modification in the form of a "hollow". It be actually involve three-dimensional hollows, the depth of which is expressed for example in tens of millimeters, or "pseudo-motifs" which are more surface motifs than volume motifs and are of very little depth, the depth of which tends to be expressed rather in microns or tens of microns.

Within the context of the invention, the term "diffusive" focus means a focus which is at least partially diffusive, in particular mainly diffusive and even essentially diffusive, without ruling out the possibility that a part, small or otherwise, of the rays which strike it may be reflected and/or absorbed by said focus.

These alterations will have the primary function of diffusing the light rays which may propagate into the thickness of the covering or of the screen, emitted in particular by one or more secondary light sources of suitable configuration that will be described below. The covering or screen then plays the role of optical guide, the light rays entering by way of their edges into their thickness and propagating therein by a succession of total reflections. When at least some of these light rays strike the diffusive foci according to the invention, the rays in question diffuse, at least in part, in multiple directions. To the observer, everything will take place as if these diffusive foci were themselves light sources. And they are preferably designed such that they do not substantially affect the main optical functions provided by the main light sources (in particular their colour, the shape or the intensity of the beams). As a function in particular of the shape, size and distribution of the diffusive foci, and as a function also of the power/photometry of the light rays propagating into the thickness of the covering or of the screen, it is then possible to create external aspects that are highly original and varied depending on whether the main optical functions of the lamp or headlamp are turned on or off. Thus, it is possible to achieve the situation where the local diffusions of light interact so as to give the impression that the whole of the screen or covering is lit up. The external observer then has the impression that the entire outer surface of the lamp is lit up, in particular when only one of the main optical functions of the lamp is on. The "signature" of the lamp that it had when it was turned off can thus be seen when it is on. This is particularly advantageous for the "rear wing" lamps mentioned above in which it is possible, by virtue of the invention, to light up the rear wing surface whereas usually the volumes available in these areas are very restricted and consequently it is difficult to insert conventional light sources therein.

However, the invention may be used for a wide range of other applications. Thus, it is possible to adapt the configuration of the diffusive foci so that they create zones that are continually lit up and localized on the screen or the covering: this may involve, for example, "highlighting" the main optical functions with diffusive foci localized on the covering or screen around the zone facing the main light source. It may also be desired for all or some of the diffusive foci to appear as localized light sources without interaction with one another. One variant also consists in "highlighting", with diffusive foci placed at the periphery of the covering or screen, the contours of the outer surface of the lamp. Another variant consists in using these diffusive foci to provide a main optical function, as a sidelight, by choosing the suitable secondary light sources. The invention then makes it possible to optionally omit a standard main light source.

According to one variant of the invention, at least one of the faces of the closing covering and/or of the optional intermediate screen is provided with one or more foci for reflecting light by means of surface alteration(s) of said face. The alterations should be understood in the same sense as above, but in this case they are configured so as to reflect, at least in part, the light beams which propagate into the thickness of the screen or covering.

Thus, in one embodiment consisting of "hollows" at the surface of the screen or covering, the walls may be at least partially polished.

The term "reflective" focus is understood to mean a focus that reflects most, in particular essentially all, of the light rays that strike it, but it may also, to a small extent or otherwise, be diffusive and or absorbent with respect to said rays.

The advantage of providing the screen or covering with this type of reflective foci is that it is possible to concentrate/ send back light from this focus or these foci, in a controlled manner and in a given direction, out of the lamp. A brake lamp may in particular be obtained on the basis of one or more reflective foci of appropriate configuration and localization. This focus or these foci which is or are associated with the ad hoc secondary light sources may therefore replace a standard light source for a main optical function of the brake/indicator lamp type.

Advantageously, the surface alterations (of the diffusive foci and/or of the reflective foci) of the face of the closing covering or of the intermediate screen are in the form of hollows with respect to the otherwise essentially smooth surface of said face. This configuration is actually preferable to a configuration of the boss type since the grazing light rays passing through the covering or the screen are intercepted by hollowed motifs whereas they would not be by bosses: the yield would not be as good.

Advantageously, the hollows have an apparent surface area of between 0.05 and 5 mm$^2$, in particular between 0.1 and 1 mm$^2$. The term "apparent surface area" is understood to mean the surface area which is delimited by the edges of the cavity, measured in the plane of the face of the screen or covering thus modified. Yet more advantageously, said hollows have a maximum depth of between 0.001 or 0.05 and 2 mm, in particular between 0.1 and 1 mm. When "pseudo-motifs" are involved, however, which are more surface motifs than volume motifs, they may be of very little depth, from ten to several tens of microns.

Yet more advantageously, said hollows have walls that are at least partially diffusive. Preferably, these motifs or hollows are not contiguous with respect to one another and/or are arranged on just one of the faces of the screen or of the covering.

These dimensions/features are preferred in particular as they make it possible to limit/avoid any optical interference between these foci and the photometry/distribution of the light beams emitted by the main light source(s). These beams pass through the covering or the screen without being appreciably affected by these surface alterations. Moreover, since the covering or the screen is preferably made of a plastics material and transparent, these diffusive foci are, with such dimensions, invisible or almost invisible to the naked eye when one looks at the lamp.

Advantageously, the diffusive foci are on the inner face of the closing covering (which avoids exposing them to bad weather or to risks of fouling) or on at least one of the faces of the intermediate screen if the latter is present.

Advantageously, the lamp comprises an intermediate screen, treated according to the invention, the geometric shape of which at least partially mates with that of the closing covering. Thus, if the entire surface of the screen is treated according to the invention, it will be possible to have the effect of the lamp being entirely lit up on its outer surface, as if it were the covering which had been treated.

As already mentioned, the distribution of the diffusive foci on the face of the closing covering or of the intermediate screen may be random, regular, or follow one or more patterns.

It may also be centred on a zone that corresponds to a primary indicating or lighting function provided by a main light source.

In order that the diffusive foci (and reflective foci if there are any) may seem like light sources, they are associated with one or more secondary light sources capable of emitting light that propagates into the thickness of the covering or screen. They are preferably chosen from light-emitting diodes, the ends of optical fibres, microlamps having a filament, or one or more neon lamps. Light-emitting diodes are preferred since these have the advantage of being small: they adapt well to the small thickness of the coverings or screens (1 to 8, in particular 2 to 5 mm in general). Preferably, the perimeter of the closing covering or of the screen, the face of which is treated according to the invention, is divided into at least one "active" zone which faces at least one secondary light source and at least one "passive" zone without a secondary light source.

According to a first variant, the "active" zone(s) comprise a plurality of recesses that are spaced apart from one another and can each at least partially accommodate the head of the secondary light source of the light-emitting diode type. With recesses of the semi-spherical type and diode heads of complementary shape, it is possible to trap in the best way possible, in the thickness of the covering or of the screen, the light flux emitted by the diode over 180° (the diodes are generally fixed to a flat support).

According to a second variant, use is rather made of a continuous recess that can at least partially accommodate the head of secondary light sources of the light-emitting diode type, in particular a plurality of aligned diodes. It is possible to choose a recess of the semi-cylindrical type, with an alignment of diodes, for the same objective: trapping/capturing in the best way possible, in the thickness of the material, the light emitted by the diodes.

Still for this objective, the perimeter of the covering or of the screen at the "active" zones may have a section that is modified so as to optimize recovery of the light emitted by the secondary light source(s), in particular a section having a bulge preferably around the recess(es) that at least partially accommodate said secondary light sources. The material of the covering or of the screen thus recovers the flux over a larger angular opening.

Preferably, the perimeter of the covering or of the screen at the "active" zones has a section that is modified so as to allow direct or indirect fixing of the secondary light source(s) of the diode type. This may be a protrusion that serves as a fixing base for one or more support elements for light-emitting diodes. Preferably, the support elements for light-emitting diodes are fixed by means of clipping or adhesive bonding. It is also possible to press the face of the diode support that is fitted with the diodes against the base of the screen or of the covering, so that the diodes are accommodated in the recess(es) located on the perimeter of the covering or screen.

Figure 9A:
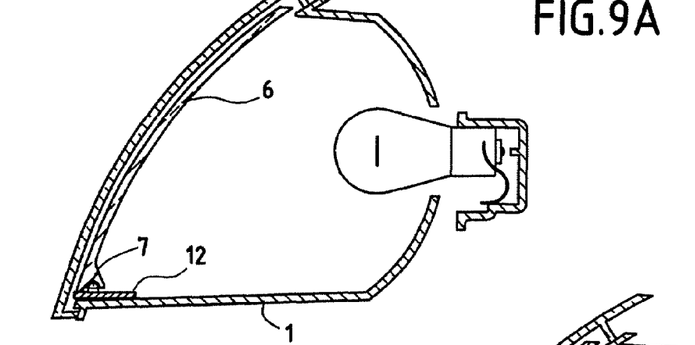
FIGS. 9a to 9c show views of various ways of fixing the diode support to the casing and the entry of light into the screen of the lamp.
Figure 9B:
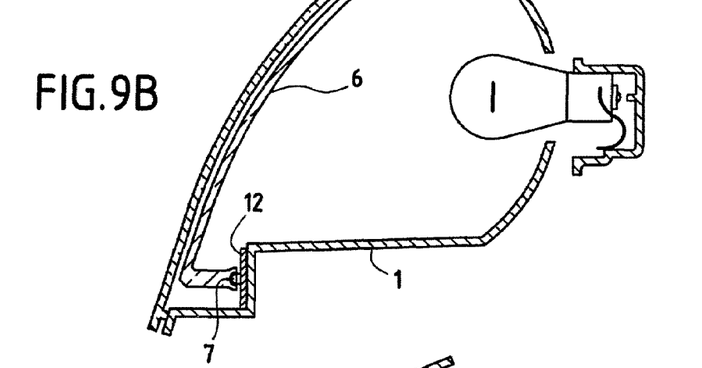
Figure 9C:
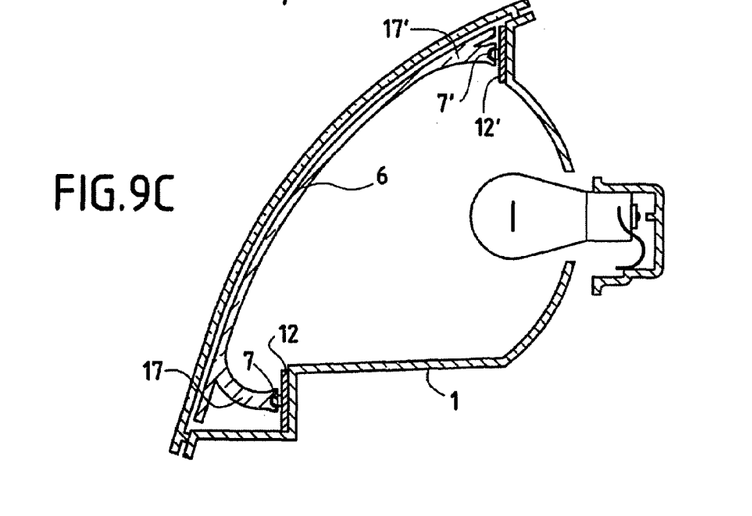

Another variant consists in moving the diodes away from the edge of the covering, and in using means for channelling the light emitted by the diodes to the perimeter of the covering or screen. It is thus possible to position the electronic card, which supports the LEDs and their power supply, on a face belonging to the casing at the rear of the lamp (or headlamp). Examples according to these variants are illustrated in FIGS. 9a, 9b, 9c. The light emitted by the diodes is recovered by a suitable optical system derived from the screen to be illuminated. The manufacture of the final product is thereby facilitated.

At the "passive" zones of the perimeter of the covering or of the screen, the edge of the covering or of the screen may, according to a first variant, be treated so as to reflect into the thickness of the material the light beams that strike it. This treatment may in particular consist in a metallization of the edge, which may keep its usual simplest geometric shape, that is to say be flat and substantially perpendicular to the faces of the screen or of the covering. This treatment may also consist in modifying the shape of the edge, in particular by means of double bevelling. In both cases, the yield of the secondary light sources of the diode type is thus increased.

According to a second variant, the edge of the covering or of the screen at the "passive" zones may be treated so as to reflect out of the device (through the closing covering) the light beams that strike it, in particular by modifying the shape of the edge. An edge having single bevelling may therefore be produced. In this specific case, seen from outside, one has the impression that the edge thus treated of the covering or of the screen plays the role of a light source, by total reflection of the light.

The bevelling, single or double, of the edge may be obtained during the actual moulding of the covering or screen itself.

The secondary light source(s) of the light-emitting diode type, relayed through the light-diffusing foci and possibly the light-reflecting focus or foci, may fulfil the function of front and/or rear sidelights and thus be a substitute for a conventional main light source.

The object of the invention is also the method of obtaining the device described above, and in particular the method of obtaining the screen and/or covering modified with superficial light-diffusing foci (and possibly light-reflecting foci). According to a first variant, these foci are obtained directly during moulding of the closing covering or of the intermediate screen. This is the preferred variant since it does not add any particular operation to the manufacture of the covering or of the screen. The mould is to be adapted as a function of the shape of the desired motifs. This involves in particular a mould having walls provided with micro-asperities, burrs. According to a second variant, the covering or screen is manufactured conventionally by moulding and one of their faces is subjected to at least one post-treatment, for example a mechanical abrasion treatment or a laser treatment. This post-treatment may also consist of a surface treatment in vacuo using masks. It is also possible to associate with the screen or with the covering a sheet based on a plastics material, for example made of polycarbonate or PMMA, and having the required reliefs, it being possible for the association to be carried out by calendering and thermoforming.

The invention also relates to the motor vehicle equipped with indicating/lighting devices as described above.

The invention will be described in detail hereinbelow with reference to non-limiting examples and to the figures which follow:

DESCRIPTION OF THE PREFERRED EMBODIMENTS

Figure 1:
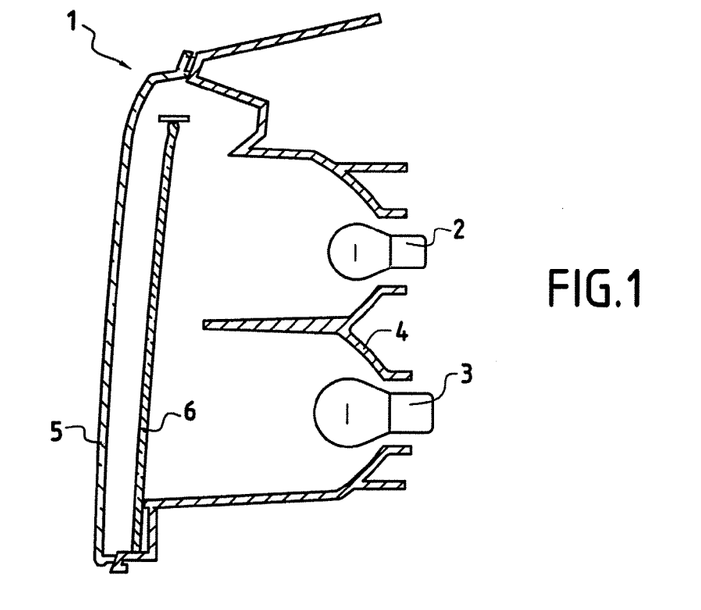
FIG. 1 shows a section through a lighting/indicator lamp.

A lighting/indicator lamp is usually composed at least of the following elements, as shown in FIG. 1:
  a casing 1,
  one or more main light sources 2, 3, such as a halogen lamp, a xenon lamp or a light-emitting diode (hereinafter referred to as diode),
  a reflector 4, for example made of a metallized plastics material,
  a closing covering 5,
  an optional inner screen 6, which spatially distributes the light depending on the optical function to be realized (headlamp, brake lamp or fog lamp for example). This assembly must comply with the standards but also significantly adds to the style of the vehicle.

Figure 2A:
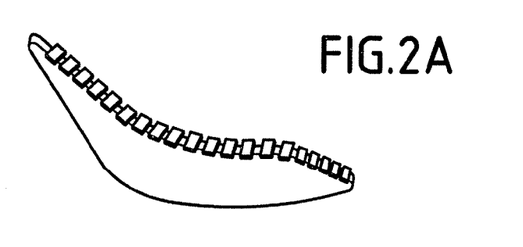
FIGS. 2a, 2b, 2c show a lamp screen, seen from different angles.
Figure 2B:
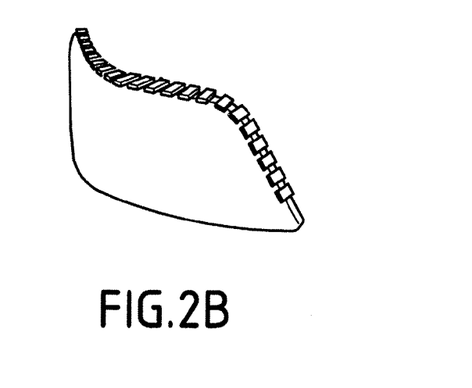
Figure 2C:
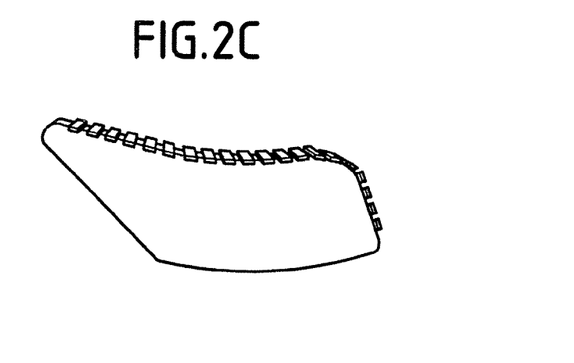

In the exemplary embodiment of the invention, there is a screen 6, which is seen from different angles in FIGS. 2a to 2c. This screen is made of a transparent plastics material, PMMA (polymethyl methacrylate), having a thickness of between 2 and 5 mm, in particular so as to facilitate its manufacture by injection moulding. Its colour may be crystal (colourless), pink or tinted so as to remain compatible with the reverse and/or direction indicator functions. On part of its perimeter there are small light-emitting diodes 7 which transmit light into the thickness of the screen 6, where it is trapped by virtue of the internal total reflection between the two faces of the screen, forming a light guide. Although light guides by total reflection with symmetry of revolution may already be known, here the invention uses a screen as guide, with two mutually parallel faces, and this is very innovative. The diodes 7 are in this example only present on part of the perimeter of the screen, on its "active" zone 8 as explained above. The rest of the perimeter is the "passive" zone.

Figure 3:
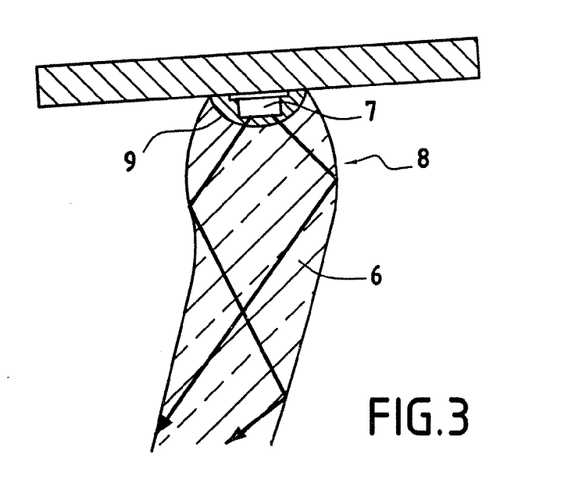
FIG. 3 shows an "active" screen perimeter showing a head of a light-emitting diode.

At the "active" perimeter 8, modifications to the shape of the screen are carried out so as to make maximum use of the light flux emitted by the diodes 7, as shown in FIG. 3. In this figure it is possible to see the active zone 8 of the screen 6 which has a recess, a cavity 9 at the periphery. This cavity has the approximate shape of a portion of a sphere, and accommodates a diode head 7. It will be understood that the perimeter of the screen is provided with a plurality of these cavities 9, each being intended to accommodate one diode 7. Of course, it is also possible to have just one continuous cavity, for example having the shape of a portion of a cylinder, for accommodating several aligned diodes. The respective dimensions/shapes of the cavities and of the diode heads are preferably complementary, with enough play that the diodes can be easily accommodated in the cavities. Furthermore, there is a bulge of the screen on this active perimeter, which surrounds the cavities 9. The combination of the cavities 9 and of the bulge (one bulge per cavity if there are a number of cavities, one continuous bulge if there is just one cavity accommodating a number of diodes) makes it possible to recover all or almost all of the light energy of the diodes on an emission cone which may be up to 180°.

Figure 5A:
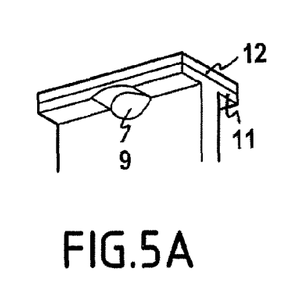
Figure 5B:
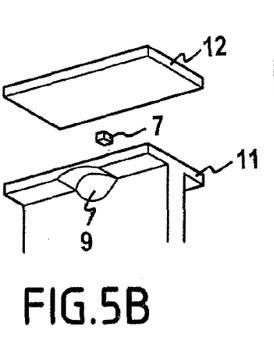
Figure 5C:
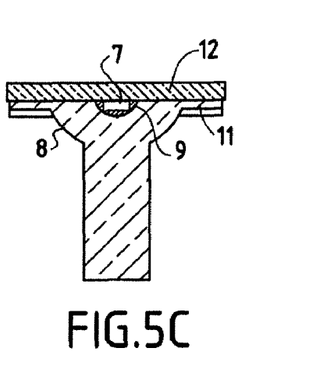
Figure 5D:
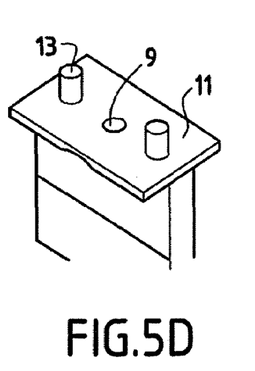
Figure 5E:
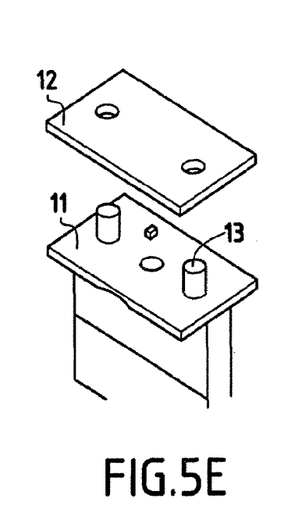
Figure 5F:
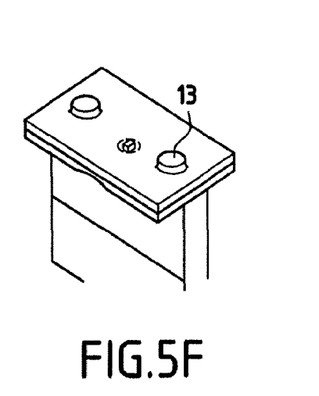

FIGS. 5a-5f show a third modification of the section of the screen 6 at the "active" zones. FIG. 5a shows, seen from below the cavity 9, the bulge, but also a base 11 which is a flat zone that is approximately perpendicular to the plane of the screen. This flat zone 11 will make it possible to fix the support plate 12 of the diodes 7. It can be seen in FIG. 5c that the width of the base 11 coincides with that of the support plate 12. When the support plate 12 is placed on the base 11, the diodes 7 are placed in the cavities 9. To fix the plate 12 to the base, various mechanical solutions are possible, including adhesive bonding, screwing or else clipping. FIGS. 5d-5f show a third solution: riveting. The rivets 13 are located on the base (again in this case moulded with the screen) in FIG. 5d; in FIG. 5f they are flattened so as to rivet the two parts together and block the diodes 7 in position.

Figure 4:
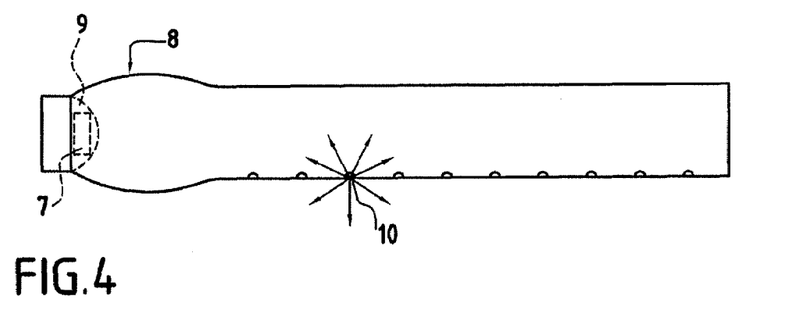
FIG. 4 shows an enlarged view of the perimeter shown in FIG. 3, FIGS. 5a to 5f show views of the manner of fixing the diode support to the base of the screen.
Figure 6A:
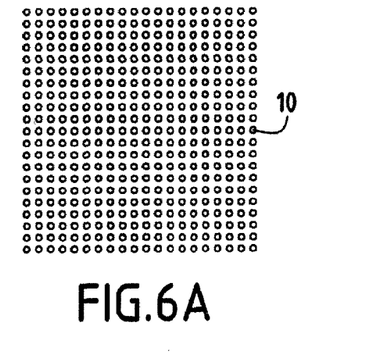
FIGS. 6a to 6d show various ways of distributing the diffusive foci over the surface of the screen.
Figure 6B:
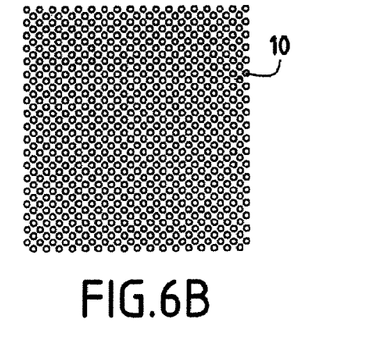
Figure 6C:
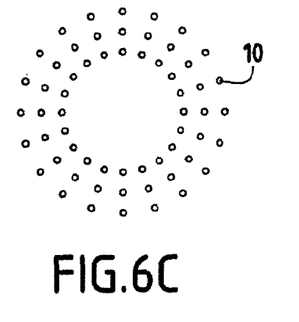
Figure 6D:
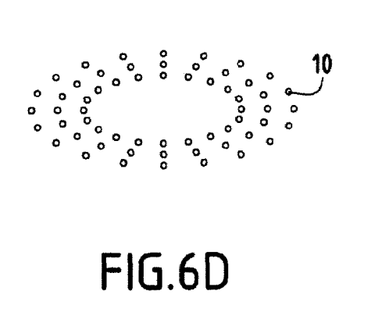

FIG. 3 shows two paths of two rays emitted by one of the diodes 7. It can be seen that they pass through the thickness of the screen 6 by successive reflections on the faces of the screen. As shown in detail in FIG. 4, these successive reflections are interrupted when the rays meet diffusive foci 10 created according to the invention on the surface of one of the faces of the screen. These rays which are in the vicinity of the face modified in this way (the grazing rays) will diffuse in all directions (indicated by the arrows). These foci 10 are diffusive hollow motifs which are on the polished optical surface of the screen 6. Each focus 10 then acts as a secondary optical source. It is then possible to have all sorts of distribution of these diffusive "hollows" depending on the desired effect. FIGS. 6a to 6d thus give some examples of distribution, these representations not being to scale for the sake of clarity. The dimensions of these hollows are of an apparent surface area of from 0.1 to 1 or 2 mm, they have variable depths of from a few hundredths of a millimeter to one millimeter, their shape may be evolutional, in particular from round to rectangular, and their surface finish is diffusive by way of structured micromotifs so as to optimize the isotropic spatial diffusion, regardless of the position of the observer following the vehicle. By contrast, if it is desired to create reflective foci, their surface finish may be rather that of an optical polished surface. Their distribution may be homogeneous, regular or evolutional in a given direction (FIG. 6c or 6d). The "pixelization", that is to say the mode of distribution of the foci, may be organized in a predefined or random web pattern. The distance between two foci is variable, for example between 1 mm and 10 to 20 mm. The distribution may make it possible to highlight a primary optical function (FIG. 6a or 6b). These foci 10 are obtained directly during moulding of the screen, by providing the mould with suitable reliefs. It is thus possible to obtain an effect of a screen illuminated over part of its surface or over its entire surface. The observer will see the entire surface of the lamp lit up and there is a "trompe l'oeil" effect which gives the impression of a three-dimensional lamp, increasing the style value of the vehicle. The signature of the lamp is thus retained whether it be on or off.

Figure 7A:
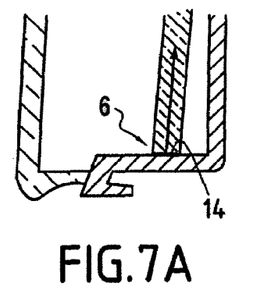
FIGS. 7a to 7c show various ways of treating the edge of the screen at the "passive" zones.
Figure 7B:
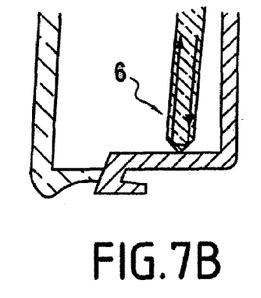
Figure 7C:
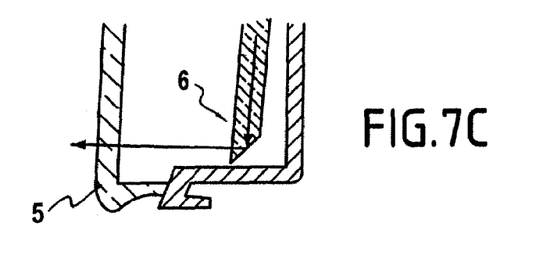

FIGS. 7a-7c show the various ways of treating the "passive" perimeters of the screen 6. FIG. 7a shows the screen 6 the edge of which is covered with a metallic/reflective coating 14 (in vacuo metallization of the edge). The rays "distribute" into the thickness of the screen. FIG. 7b shows an identical result, obtained by an edge that is bevelled on two sides (a shape that can be obtained during moulding). FIG. 7c shows an edge that is bevelled on just one side: in this case, the ray leaves in a direction determined by the way in which the edge is bevelled, in this instance approximately perpendicular to the screen through the covering 5.

Figure 8:
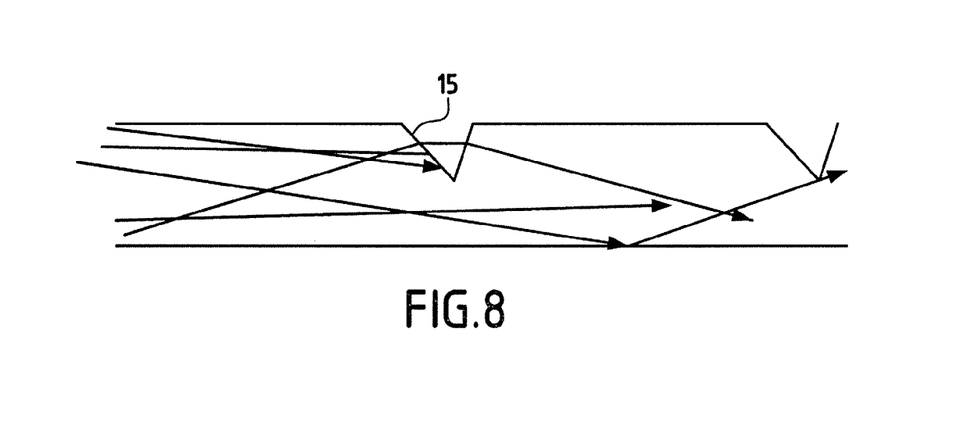
FIG. 8 shows a sectional view of the screen at a light-reflecting focus.

FIG. 8 shows a variant that consists in providing the face of the screen which has already been provided with diffusive foci with another type of foci: reflective foci 15. This motif or these motifs may be obtained in the same manner as the diffusive foci 10. The path of the rays that strike these foci 15 (for example consisting of motifs similar to the diffusive motifs, but with walls that are smooth, polished and treated so as to be reflective) is indicated by the arrows: at least some of the rays (depending on their angle of incidence) will go out of the screen, in particular through the covering 5. This focus or these foci may be arranged in a specific zone so as to concentrate the light in spatial terms (in the case of the brake function for example).

FIGS. 9a, 9b and 9c show three ways of moving the diodes 7 from the perimeter of the diffusive screen 6. In FIG. 9a, the electronic card 12 supporting the diodes is fixed to the inner wall of the casing 1, in a zone that is substantially horizontal in the position in which it is assembled in the vehicle, near the perimeter of the screen 6. Said perimeter is then modified, widened, if necessary, so as to be able to channel, as above, the light emitted by the diodes 7. FIG. 9b shows another configuration, in which the diode support 12 is fixed to a vertical wall of the casing, with modification of the perimeter of the screen so as to capture most of the light emitted by the diodes 7. This zone of the perimeter may form an integral part of the screen or be attached to the screen. FIG. 9c shows a configuration similar to that of FIG. 9b, but in this case the perimeter of the screen in the lower part is not modified by a simple extension, a curving of its lower perimeter: in this case the standard lower edge of the screen is kept and deflecting elements 17 are added. In the upper part of the screen, use is also made of a series of diodes 7' on their support 12' which are fixed to a vertical wall of the casing. Deflecting elements 17' are also provided to recover the light emitted by these diodes 7'. The deflecting elements 17 or 17' are either arranged side by side or form a continuous protrusion along each of the edges of the screen. The "appendices" formed by these elements 17, 17' or by this extension of the perimeter of the screen therefore collect the flux emitted by the diodes and distribute it spatially into the thickness of the covering or of the screen. The diode supports are advantageously integral with the casings of the lamps or headlamps according to the invention.

The invention therefore opens up new perspectives in terms of style, while remaining feasible in industrial terms. It is possible to adjust, in the best way possible, the nature and distribution of the diffusive foci within the context of the invention, it being possible for the latter also to be partially reflective (for example in the form of "facetted" hollows, with walls that are locally reflective and locally diffusive): it is therefore a case of reflective/diffusive "hybrid" foci.

It should also be noted that it is possible to combine, in the same lamp or the same headlamp, several screens treated according to the invention, either by juxtaposing them or by superposing them, it being possible for each screen to have its own distribution/its own type of diffusive and/or reflective foci.

The invention can advantageously be applied to the rear indicating function of vehicles or to the front indicating function of vehicles, in particular to realize, at the front, the sidelight function. The modifications made by the invention to the covering or to the intermediate screens of course do not adversely affect the usual photometric functions expected of motor vehicle lamps or headlamps. This is because the entire screen or covering is transparent and polished, and only the motifs may very slightly disrupt the light beam emitted by the main light source.

What is claimed is:

1. An indicating or lighting device for a motor vehicle, said device comprising a casing inside which there are arranged at least one intermediate screen that is substantially transparent and an outer lens for the casing, wherein a face of the outer lens or of the intermediate screen is provided with a plurality of foci for diffusing light by means of surface alterations of said face,
   wherein the surface alterations of the face of the outer lens or of the intermediate screen are in the form of hollows with respect to the otherwise essentially smooth surface of said face, and
   wherein the hollows have an apparent surface area of between 0.05 and 5 mm$^2$.

2. The device according to claim 1, wherein the hollows have an apparent surface area of between 0.1 and 1 mm$^2$.

3. An indicating or lighting device for a motor vehicle, said device comprising a casing inside which there are arranged at least one main light source, at least one reflector associated with the main light source(s), at least one intermediate screen that is substantially transparent and lies opposite said main light source or at least one of said main light sources, and an outer lens for the casing, wherein a face of the outer lens or of the intermediate screen is provided with a plurality of foci for reflecting light by means of surface alterations of said face,
   wherein the surface alterations of the face of the outer lens or of the intermediate screen are in the form of hollows with respect to the otherwise essentially smooth surface of said face, and
   wherein the hollows have an apparent surface area of between 0.05 and 5 mm$^2$.

4. The device according to claim 3, wherein the hollows have an apparent surface area of between 0.1 and 1 mm$^2$.

5. The device according to claim 3, wherein the distribution of the diffusive foci is centered on a zone that corresponds to a primary indicating or lighting function provided by a main light source.

6. An indicating or lighting device for a motor vehicle, said device comprising a casing inside which there are arranged at least one intermediate screen that is substantially transparent and an outer lens for the casing, wherein a face of the outer lens or of the intermediate screen is provided with a plurality of foci for diffusing light by means of surface alterations of said face,
   wherein the surface alterations of the face of the outer lens or of the intermediate screen are in the form of hollows with respect to the otherwise essentially smooth surface of said face, and
   wherein the hollows have a depth of between 0.1 and 2 mm.

7. The device according to claim 6, wherein the hollows have a depth of between 0.01 and 1 mm.

8. An indicating or lighting device for a motor vehicle, said device comprising a casing inside which there are arranged at least one main light source, at least one reflector associated with the main light source(s), at least one intermediate screen that is substantially transparent and lies opposite said main light source or at least one of said main light sources, and an outer lens for the casing, wherein a face of the outer lens or of the intermediate screen is provided with a plurality of foci for diffusing light by means of surface alterations of said face,
   wherein the surface alterations of the face of the outer lens or of the intermediate screen are in the form of hollows with respect to the otherwise essentially smooth surface of said face, and
   wherein the hollows have an apparent surface area of between 0.05 and 5 mm$^2$.

9. An indicating or lighting device for a motor vehicle, said device comprising a casing inside which there are arranged at least one intermediate screen that is substantially transparent and an outer lens for the casing, wherein a face of the outer lens or of the intermediate screen is provided with a plurality of foci for reflecting light by means of surface alterations of said face,
   wherein the surface alterations of the face of the outer lens or of the intermediate screen are in the form of hollows with respect to the otherwise essentially smooth surface of said face, and
   wherein the hollows have an apparent surface area of between 0.05 and 5 mm$^2$.

10. The device according to claim 9, wherein one or more of the light-reflecting foci provide for the function of brake light.

11. The device according to claim 9, further comprising light source(s), relayed through the light-reflecting foci, to fulfill the function of sidelights.

12. An indicating or lighting device for a motor vehicle, said device comprising a casing inside which there are arranged at least one intermediate screen that is substantially transparent and an outer lens for the casing, wherein a face of the outer lens or of the intermediate screen is provided with a plurality of foci for at least in part reflecting and/or diffusing light by means of surface alterations of said face,
   wherein the surface alterations of the face of the outer lens or of the intermediate screen are in the form of hollows with respect to the otherwise essentially smooth surface of said face, and
   wherein the hollows have an apparent surface area of between 0.05 and 5 mm$^2$.

* * * * *